M. L. HEIN.
ELECTRIC RAILWAY SIGNALING SYSTEM.
APPLICATION FILED JULY 5, 1911.
1,038,129.
Patented Sept. 10, 1912.
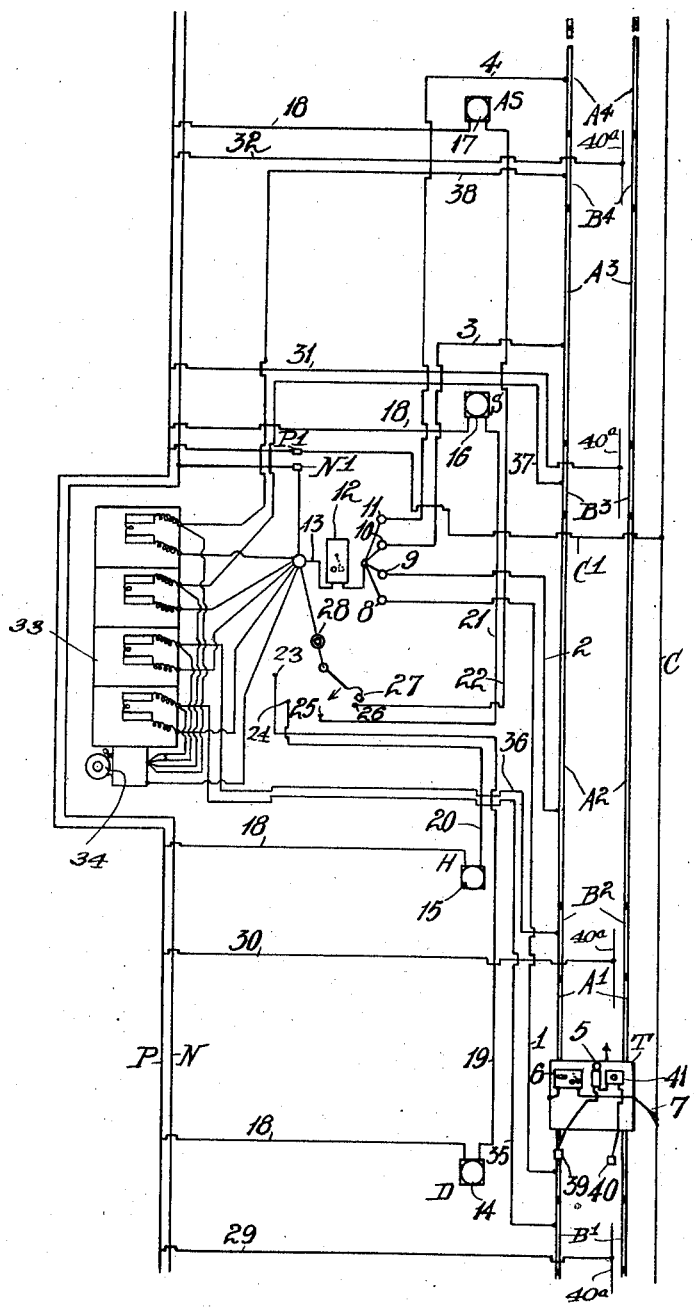
WITNESSES:
John C. Sanders
Leon Spring
INVENTOR:
Max Leo Hein,
BY
ATT'Y.

UNITED STATES PATENT OFFICE.

MAX LEO HEIN, OF MOONEE PONDS, VICTORIA, AUSTRALIA, ASSIGNOR OF ONE-HALF TO JOHN COPP, OF OAKLEIGH, AUSTRALIA.

ELECTRIC RAILWAY SIGNALING SYSTEM.

1,038,129.  Specification of Letters Patent.  Patented Sept. 10, 1912.

Application filed July 5, 1911. Serial No. 636,863.

*To all whom it may concern:*

Be it known that I, MAX LEO HEIN, a subject of the Emperor of Germany, residing at 52 Eglington street, Moonee Ponds, in the State of Victoria, Australia, ship's carpenter, have invented Improvements in Electric Railway Signaling Systems, of which the following is a specification.

This invention has been devised for the purpose of automatically signaling to the driver of an engine so that he may know the state of the road even when the line signals are obscured as for instance during fogs.

According to this invention by means of electric circuits the engine driver receives signals on the engine, and the engine automatically indicates to the signalman the location of the train on the road. In addition electric alarm bells at certain points on the road may be rung by the signalman to indicate the state of the road. By this system of signaling the dangers attendant upon fogs darkness or inclement weather are reduced to a minimum and if it is used in conjunction with the lock and block system all danger would be obviated.

The invention is illustrated by the accompanying diagram which shows the electric circuits controlling the system.

According to this invention the rails are insulated so as to divide them into sections of which the "signaling" sections indicated by $A^1$, $A^2$, $A^3$, $A^4$ are used to complete a circuit with the engine T, by means of which a "line clear" signal is given to the driver, while the shorter or "warning" sections $B^1$, $B^2$, $B^3$, $B^4$ are utilized for indicating to the signalman the location of the train and for warning the driver that he is approaching a signaling section.

The road may be provided with any number of these insulated sections and the four for each purpose which are indicated in the diagram, are shown placed about the position of the usual road signals known respectively as distance D, home H, starter S, advance starter AS.

The main supply electric current flows through lines PN, and a wire or like conductor C provided about each signal box is laid parallel to the rails and connected by line $C^1$ with the main terminal $P^1$.

The engine is provided with an indicator 6 which may consist of a miniature signal arm and disks and in addition with a contact maker 7 adapted to contact with the conductor C.

The sections $A^1$, $A^2$, $A^3$, $A^4$ are connected by lines 1, 2, 3, 4 with switches 8, 9, 10, 11 connected to an indicator 12 in circuit with line 13 leading to terminal $N^1$. Thus when a train enters section $A^1$ for instance and the switch 8 is off showing the road is not open the circuit by line 1 and conductor C through the medium of the engine wheels and contact maker 7 is broken and the indicator 6 in the engine shows this, so that the driver must stop. When the switch 8 is put on by the signalman when the road is clear, the circuit just mentioned is completed and the indicator 6 in engine shows this and the driver is permitted to pass the train to the next signaling section. The same operation takes place in regard to the other sections $A^2$, $A^3$, $A^4$ in connection with the switches 9, 10, 11.

The indicator 12 shows normally in the danger position until a switch makes a contact thus if a contact is made but the indicator does not show the line clear indication it is evident that a circuit is broken and so a driver will not receive the line clear signal thus insuring safety in the working of the system.

If desired electric alarm bells 14, 15, 16, 17, may be provided at convenient places along the road, preferably at the commencement of the signaling sections $A^1$, $A^2$, $A^3$, $A^4$. The bells are connected by lines 18 with the main line P and by lines 19, 20, 21, 22 with terminals 23, 24, 25, 26 across which a switch 27 may be moved so that by operating a push contact 28 a warning or signal may be given the driver as for instance during foggy weather when the train is about to enter one of the signaling sections.

Each section $B^1$, $B^2$, $B^3$, $B^4$ has associated therewith an insulated contact piece $40^a$ which are respectively connected by lines 29, 30, 31, 32 with the main P and one of the rails of each section is connected with an indicator 33 provided with a bell 34 respectively by lines 35, 36, 37, 38 so that as the engine enters these sections the wheels complete the circuit and the signalman is warned by the bell 34 and the exact position of the train is shown by the indicator 33. The engine is moreover provided with two contact makers 39, 40 engaging one of the rails and the insulated contact pieces respectively and is also provided with an indicator 41 and bell 5. By this means as the engine passes over the sections $B^1$, $B^2$, $B^3$, $B^4$ this bell and indicator circuit is completed through the contact makers 39, 40 whereby the bell rings and the indicator is operated to warn the driver that he is about to enter one of the signaling sections $A^1$, $A^2$, $A^3$, $A^4$.

The sections $B^1$, $B^2$, $B^3$, $B^4$ therefore effect the dual objects of simultaneously apprising the signalman and driver that the train is entering a signaling section.

The system of signaling operates in the following manner. Assuming a train is advancing toward the section $B^1$ the arm of the miniature signal device 6 is up normally, indicating danger, and when the engine T enters section $B^1$ the bell 5 rings and the indicator 41 is operated also the bell 34 and the indicator 33 in the signal box so that both driver and signalman are warned that the train is about to enter section $A^1$ and they both know that the engine has entered by the indicators 41 and 33 and their bells thereof ceasing to ring by reason of the broken circuits. If the road is not clear the alarm bell 14 may be rung by the signalman merely as a warning to the driver who knows by the arm of his miniature signal device being up that the circuit of the signaling section $A^1$ is broken and that the road is not clear. The driver must therefore stop until switch 8 is put on and the circuit of section $A^1$ is complete. The signalman knows if the driver has received his line clear signal by his indicator 12. The train then advances till the driver receives his next warning at section $B^2$. By this system therefore the driver receives his signals in the engine and the signalman the warnings in the box so that fogs, etc., do not interfere with the receiving of the signals.

In the system of signaling described visual road signals are not necessarily employed, but signal posts with lamps might be erected at the location of the alarm bells 14, 15, 16, 17, i. e. about the position of the signaling sections. If, however, this system were used in conjunction with the lock and block signaling system the usual road signals would be employed.

I claim:—

1. In electric railway signaling systems, a signal box, a series of divided insulated rail sections, constituting warning sections and signaling sections, an indicator in the engine of the train, an indicator in the signal box, circuit connections whereby said indicators are automatically put in circuit by the passage of the engine over said warning sections, a signal device in the engine, a signal switch in the signal box, and circuit connections whereby said signal device and said signal switch are put in circuit by the passage of the engine over said signaling sections.

2. In electric railway signaling systems, an engine fitted with a signal device and a pair of contact makers, a pair of rails divided at predetermined points into insulated sections constituting warning sections and signaling sections, insulated contact pieces associated with said warning sections, an electric supply conductor arranged parallel to said rails, a signal box provided with signal switches and an indicator, there being a signal switch associated with each of said signaling sections, circuit connections associated with each signaling section and with its respective signal switch and with said indicator at the signal box and with the signal device on the engine, said circuit connections and the associated devices being energized when one of said contact makers engages said supply conductor and the train is in a signaling section, an indicator and a bell at the signal box operatively associated with said warning sections, and circuit connections for energizing said second-mentioned indicator and said bell when the second of said contact makers engages said insulated contact pieces.

3. In electric railway signaling systems, an engine fitted with a signal device and a pair of contact makers, a pair of rails divided at predetermined points into insulated sections constituting warning sections and signaling sections, insulated contact pieces associated with said warning sections, an electric supply conductor arranged parallel to said rails, a signal box provided with signal switches and an indicator, there being a signal switch associated with each of said signaling sections, circuit connections associated with each signaling section and with its respective signal switch and indicator at the signal box and with the signal device on the engine, said circuit connections and the associated devices being energized when one of said contact makers engages said supply conductor and the train is in a signaling section, an indicator and a bell at the signal box, a third contact maker on the engine adapted to engage one of the rails, a bell and an indicator on said engine, and circuit connections for energizing said bells and said second and third mentioned indicators when said third contact maker engages the rail and said second contact maker engages said insulated contact pieces.

In testimony whereof I have hereunto set my hand in presence of two subscribing witnesses.

MAX LEO HEIN.

Witnesses:
 EDWARD WATERS,
 EDWARD N. WATERS.

---

Copies of this patent may be obtained for five cents each, by addressing the "Commissioner of Patents, Washington, D. C."